US006947276B2

(12) United States Patent
Hirata et al.

(10) Patent No.: US 6,947,276 B2
(45) Date of Patent: Sep. 20, 2005

(54) PROCESS FOR PRODUCING LAMINATED CERAMIC CAPACITOR

(75) Inventors: Kazuki Hirata, Osaka (JP); Kenji Oka, Chitose (JP); Kazuhiro Komatsu, Chitose (JP); Atsuo Nagai, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/502,620

(22) PCT Filed: Oct. 24, 2003

(86) PCT No.: PCT/JP03/13667

§ 371 (c)(1), (2), (4) Date: Jul. 27, 2004

(87) PCT Pub. No.: WO2004/038743

PCT Pub. Date: May 6, 2004

(65) Prior Publication Data

US 2005/0102808 A1 May 19, 2005

(30) Foreign Application Priority Data

Oct. 28, 2002 (JP) ............................ 2002-312446

(51) Int. Cl.[7] ............................................ H01G 4/228

(52) U.S. Cl. ................ 361/306.3; 361/311; 361/321.2; 361/322; 29/25.41

(58) Field of Search ..................... 361/311–313, 321.2, 361/321.3, 321.4; 501/136–138; 29/25.41, 29/25.42

(56) References Cited

U.S. PATENT DOCUMENTS 4,474,894 A * 10/1984 Hardtl ........................ 501/136
6,556,422 B2 * 4/2003 Kim et al. ............... 361/321.2
6,628,502 B2 * 9/2003 Masumiya et al. ...... 361/321.2

FOREIGN PATENT DOCUMENTS

| | | |
|---|---|---|
| JP | 6-318404 | 11/1994 |
| JP | 8-183659 | 7/1996 |
| JP | 2000-277368 | 10/2000 |
| JP | 2001-163675 | 6/2001 |
| JP | 2001-345230 | 12/2001 |
| JP | 2002-234769 | 8/2002 |
| JP | 2003-068561 | 3/2003 |
| WO | WO 00/48963 | 8/2000 |

* cited by examiner

*Primary Examiner*—Anthony Dinkins
(74) *Attorney, Agent, or Firm*—McDermott Will & Emery LLP

(57) ABSTRACT

The present invention relates to a method of manufacturing a multilayer ceramic capacitor, having the steps of: (a) alternately layering internal electrodes and ceramic green sheets containing a ceramic material having barium titanate to form a laminated body; (b) sintering the laminated body to obtain a sintered body; and (c) forming an external electrode on end faces of the sintered body to obtain a multilayer ceramic capacitor. The barium titanate has a diffraction line derived from (002) plane and a diffraction line derived from (200) plane in an X-ray diffraction chart. The ratio $I_{(200)}/I_b$ of peak intensity $I_{(200)}$ at $2\theta_{(200)}$ to diffraction intensity $I_b$ at a midpoint angle between peak angle $2\theta_{(002)}$ of the diffraction line derived from the (002) plane and peak angle $2\theta_{(200)}$ of the diffraction line derived from the (200) plane is 2 to 10. The product r·Sa of mean particle size r ($\mu$m) of the barium titanate and specific surface area Sa ($m^2/g$) is 1 to 2.

3 Claims, 1 Drawing Sheet

13
14
11 10
12

PROCESS FOR PRODUCING LAMINATED CERAMIC CAPACITOR

TECHNICAL FIELD

The present invention relates to a method of manufacturing a multilayer ceramic capacitor having dielectric layers that are composed mainly of barium titanate.

BACKGROUND ART

Multilayer ceramic capacitors are structured such that dielectric layers and internal electrode layers are alternately layered. These multilayer ceramic capacitors are widely used as electronic components that are small in size but has a large capacitance and a high reliability.

The material of the dielectric used in such capacitors is required to have high relative dielectric constant, small dielectric loss, and good temperature characteristics.

To meat such requirements, there has been a proposal of using barium titanate of which X-ray diffraction chart is such that the ratio ($I_{(200)}/I_b$) of the peak intensity $I_{(200)}$ at $2\theta_{(200)}$ to the diffraction intensity ($I_b$) at a midpoint angle between the peak angle $2\theta_{(002)}$ of the diffraction line derived from the (002) plane and the peak angle $2\theta_{(200)}$ of the diffraction line derived from the (200) plane is 4 to 16 (see Japanese Laid-Open Patent Publication No. 2001-345230).

However, according to this method, when dielectric layers are formed from particles having a large variation in particle size, the resultant multilayer ceramic capacitor may exhibit a large decline in capacitance upon application of a DC voltage (hereinafter referred to as DC bias characteristics).

When such a multilayer ceramic capacitor is mounted in a circuit and a DC voltage is applied, the capacitance lowers significantly, presenting a problem of the capacitor being unable to perform its function as designed.

Thus, the relative dielectric constant of the material of the dielectric layers may be lowered to produce a multilayer ceramic capacitor having excellent DC bias characteristics. In this case, however, enlarging the capacitance of the multilayer ceramic capacitor is not possible.

DISCLOSURE OF INVENTION

An object of the present invention is to provide a method of manufacturing a multilayer ceramic capacitor having high relative dielectric constant, low dielectric loss, and excellent DC bias characteristics.

In view of this object, the present invention relates to a method of manufacturing a multilayer ceramic capacitor, including the steps of: (a) alternately layering internal electrodes and ceramic green sheets containing a ceramic material comprising barium titanate to form a laminated body; (b) sintering the laminated body to obtain a sintered body; and (c) forming an external electrode on end faces of the sintered body to obtain a multilayer ceramic capacitor. The barium titanate has a diffraction line derived from (002) plane and a diffraction line derived from (200) plane in an X-ray diffraction chart. The ratio $I_{(200)}/I_b$ of peak intensity $I_{(200)}$ at $2\theta(200)$ to diffraction intensity $I_b$ at a midpoint angle between peak angle $2\theta_{(002)}$ of the diffraction line derived from the (002) plane and peak angle $2\theta_{(200)}$ of the diffraction line derived from the (200) plane is 2 to 10. The product r·Sa of mean particle size r ($\mu$m) of the barium titanate and specific surface area Sa ($m^2/g$) is 1 to 2.

In the above method, it is preferable that the step (a) include the step of calcining the ceramic material and then grinding it, and that specific surface area Sb ($m^2/g$) of the ground ceramic powder satisfies the relations: $Sb \leqq 1.2\,Sa$ and $0 \leqq Sb \leqq 6$.

In the above method, when 50% cumulative frequency distribution particle size D50 of the ground ceramic powder based on the number of particles is expressed by $\alpha$($\mu$m), 10% cumulative frequency distribution particle size D10 thereof is expressed by $\beta$($\mu$m), and 90% cumulative frequency distribution particle size D90 thereof is expressed by $\gamma$($\mu$m), it is preferable that the $\alpha$, $\beta$ and $\gamma$ satisfy the relations: $0.7\alpha \leqq \beta$, $\gamma \leqq 1.5\alpha$, $0.4 \leqq \alpha \leqq 0.7$, $0.3 \leqq \beta \leqq 0.5$, and $\gamma \leqq 0.8$.

BEST MODE FOR CARRYING OUT THE INVENTION

A method of manufacturing a multilayer ceramic capacitor according to the present invention includes the following three steps.

First, internal electrodes and ceramic green sheets containing a ceramic material composed mainly of barium titanate are alternately layered to form a laminated body (step (a)).

One example of a production method of the laminated body is described below.

First, a dispersion of barium titanate, serving as the main component, in a dispersion medium of water is subjected to wet mixing with a mixing means, dehydrated, and dried to obtain a ceramic material.

Figure 1:
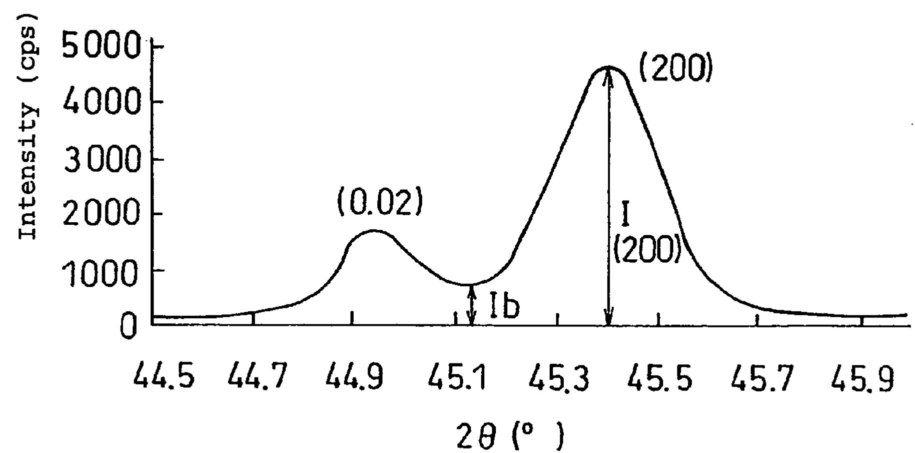
FIG. 1 is an X-ray diffraction chart of barium titanate used in the present invention.

The barium titanate used in the present invention is a tetragonal system around ordinary temperatures. When this barium titanate is subjected to an X-ray diffraction analysis, it exhibits a diffraction peak derived from (002) plane around $2\theta=44.9°$ and a diffraction peak derived from (200) plane around $20\theta=45.4°$, as shown in the X-ray diffraction pattern of FIG. 1. Therein, when the midpoint angle between the peak angle $2\theta_{(002)}$ of the diffraction line derived from the (002) plane and the peak angle $2\theta_{(200)}$ of the diffraction line derived from the (200) plane is expressed by $2\theta_b$ (i.e., $2\theta_b=(2\theta_{(002)}+2\theta_{(200)}/2)$, the ratio ($I_{(200)}/I_b$) of the peak intensity $I_{(200)}$ at $2\theta_{(200)}$ to the diffraction intensity $I_b$ at $2\theta_b$ is 2 to 10. Further, when the mean particle size of this barium titanate is expressed by a numerical value r ($\mu$m) and the specific surface area thereof is expressed by a numerical value Sa ($m^2/g$), Sa·r is 1 to 2.

When the $I_{(200)}/I_b$ is smaller than 2, the relative dielectric constant of the barium titanate lowers. When the $I_{(200)}/I_b$ is larger than 10, such barium titanate is difficult to produce.

Also, when the product r·Sa is smaller than 1, and when it is larger than 2, DC bias characteristics deteriorate.

With respect to the range of Sa and r, it is preferable that Sa=2 to 10 $m^2/g$ and r=0.2 to 0.5 $\mu$m. It is more preferable that Sa=2 to 7 $m^2/g$ and r=0.2 to 0.5 $\mu$m. It is particularly preferable that Sa=2.5 to 5 $m^2/g$ and r=0.2 to 0.4 $\mu$m.

In the present invention, it is also preferable that MgO, $SiO_2$, $Mn_3O_4$, rare earth oxides ($Dy_2O_3$, $Ho_2O_3$, $Er_2O_3$, $Yb_2O_3$, etc.) be added as sub-components. These sub-components function as part of the components constituting the second phase (the shell part of a core-shell structure) which improves the reliability of the multilayer ceramic capacitor.

It is also preferable that the sub-components be added in an amount which is in a range of 0.1 mol to 10 mol per 100 mol of barium titanate. The particle size of the sub-components is preferably in a range of 0.05 to 1 $\mu$m.

The drying after the dehydration is performed at not higher than 120° C., and preferably in a range of 100° C. to 120° C.

Also, as the mixing means, a ball mill may be used, for example. When a ball mill is used, zirconia balls having a diameter of 0.5 mm or less are preferably used to prevent excessive grinding of barium titanate upon mixing, which results in a greater particle size distribution.

Next, the ceramic material obtained in the above manner is preferably calcined. This calcination is preferably performed in a temperature range of 800° C. to 1,000° C. The obtained calcined body is macroscopically in a state of a soft mass. The results of the X-ray diffraction analysis of this calcined body indicate that the raw material particles react with each other, thereby being in a state similar to a solid solution.

Then, a dispersion of this calcined body in a dispersion medium of water is subjected to wet grinding with a grinding means, and the ground material is dehydrated and dried. For example, a ball mill or the like may be used as the grinding means. Also, when a ball mill is used, zirconia balls having a diameter of 0.5 mm or less are preferably used as the grinding medium, in order to prevent excessive grinding. Also, the drying after the dehydration is performed at not higher than 120° C., and preferably in a range of 100° C. to 120° C.

Subsequently, the ground ceramic powder is mixed with an organic binder and the like, to prepare a slurry for forming dielectric layers. It is preferable that the ground ceramic powder be mixed with alcohol such that its surface is coated with alcohol. Thereafter, the ceramic powder, of which surface is coated with alcohol, is mixed with a dispersion medium, an organic binder, and a plasticizer, to form a slurry. The above-mentioned alcohol is added to prevent the agglomeration of the ground ceramic powder, and it is preferable that the amount of the added alcohol not be greater than the total amount of the binder, the dispersion medium, and the plasticizer.

The ceramic powder coated with alcohol is preferably in a range of 50% by weight to 80% by weight of the above-mentioned slurry. The organic binder is preferably in a range of 5% by weight to 10% by weight thereof. The plasticizer is preferably in a range of 5% by weight to 10% by weight thereof. The remainder is the dispersion medium.

In preparing the slurry, ethanol or the like is used as the alcohol for coating the ground ceramic powder. As the organic binder, polyvinyl butyral resin or the like is used. As the dispersion medium, n-butyl acetate or the like is used. As the plasticizer, benzyl butyl phthalate or the like is used.

Using the slurry obtained in the above manner, ceramic green sheets serving as dielectric layers are produced. The doctor blade method, for example, is used to produce ceramic green sheets using the slurry.

Then, the ceramic green sheets and internal electrodes are layered to form a laminated body.

One example of a layering method of ceramic green sheets and internal electrodes is described below.

An internal electrode paste is screen-printed in a desired pattern on one face of a ceramic green sheet. The internal electrode paste used is composed of a base metal such as copper, nickel, or cobalt.

Two kinds of ceramic sheets, having internal electrodes of different patterns printed in the above manner, are stacked alternately and thermocompression-bonded for integration. It is preferable to perform the thermocompression-bonding in a temperature range of 80 to 140° C. and a pressure range of 80 to 200 kgf/cm$^2$.

Subsequently, the resultant sheet is cut into a predetermined size, to produce a laminated body. The laminating number of the internal electrodes and the ceramic green sheets may be set as appropriate, for example, depending on the capacitance.

Thereafter, the resultant laminated body is subjected to a binder removal treatment and then sintered, to obtain a sintered body (step (b)). The sintering temperature is preferably in a range of 1,100° C. to 1,300° C. The sintering atmosphere is preferably a reducing atmosphere, in order to prevent the oxidation of the internal electrodes. For example, an atmosphere of a mixed gas of $N_2$ and $H_2$ may be used as the reducing atmosphere.

Figure 2:
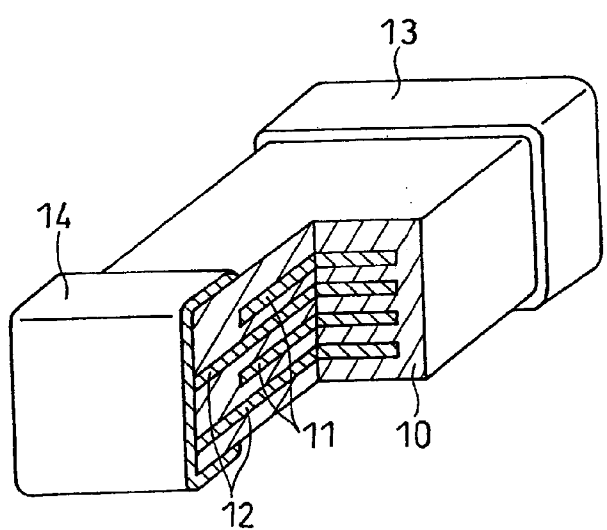
FIG. 2 is a partially cut-away perspective view of a multilayer ceramic capacitor produced by a manufacturing method of the present invention.

Lastly, an external electrode is formed on end faces of the sintered body where the internal electrodes are exposed, to obtain a multilayer ceramic capacitor as illustrated in FIG. 2 (step (c)). In FIG. 2, 10 represents a dielectric layer composed mainly of barium titanate, 11 and 12 represent internal electrodes, and 13 and 14 represent external electrodes connected to the internal electrodes 11 and 12, respectively.

The external electrodes are formed by applying an external electrode paste on the surface where the internal electrodes are exposed and baking it in a nitrogen atmosphere. The external electrode paste may be made of copper, for example.

The thickness of the dielectric layer sandwiched between a pair of opposing internal electrodes is preferably in a range of 1 to 3 am, and the thickness of the internal electrode is preferably in a range of 1 to 2 am.

When multilayer ceramic capacitors are used in actual circuits, a DC voltage is applied inevitably. The application of a DC voltage causes a decrease in the capacitance of most capacitors. As the barium titanate which is the main component of the ceramic material, the present invention uses that having a uniform particle size, of which $I_{(200)}/I_b$ is in a range of 2 to 10 and of which Sa·r is in a range of 1 to 2. Accordingly, the present invention can reduce the rate of decrease of the capacitance caused by the application of a DC voltage, that is, DC bias characteristics.

The dielectric layers of the produced multilayer ceramic capacitor are formed of particles having a core-shell structure in which the core part is made of barium titanate and the shell part is made of the above-mentioned sub-components and barium titanate. The particles having a core-shell structure include: particles in which the entire surface of the core part is covered with the shell part; and particles in which the surface of the core part is partially exposed without being entirely covered with the shell part.

Further, in the above step (a), it is preferable that the specific surface area Sb of the ground ceramic powder satisfy the relation: $Sb \leqq 1.2\ Sa$ (where $0<Sb\leqq 6$ m$^2$/g, preferably $2\leqq Sb\leqq 6$ m$^2$/g, and Sa satisfies the above-mentioned range). In this case, during sintering in the step (b), components other than barium titanate easily react with barium titanate or sub-components, thereby leading to an improvement in sinterability. Accordingly, the particles comprising barium titanate and the above-mentioned sub-components can form a uniform core-shell structure, so that it is possible to obtain dielectric layers having excellent characteristics.

Further, when 50% cumulative frequency distribution particle size D50 of the ground ceramic powder based on the number of particles is expressed by $\alpha$, 10% cumulative frequency distribution particle size D10 thereof is expressed by β, and 90% cumulative frequency distribution particle size D90 thereof is expressed by γ, it is preferable that the ground ceramic powder satisfy the relations: $0.7\alpha \leqq \beta$ and $\gamma \leqq 1.5\alpha$ ($0.4\ \mu m \leqq a \leqq 0.7$ am, $0.3\ \mu m \leqq \beta \leqq 0.5\ \mu m$, $\gamma \leqq 0.8\ \mu m$, and Sa is in the above-mentioned range).

The DC bias characteristics are also influenced by the variation in particle size of the ground ceramic powder. Thus, by narrowing the particle size distribution of the ground ceramic powder, in addition to making the particle size of barium titanate uniform, it is possible to further improve the DC bias characteristics.

Next, the method of measuring the mean particle size of barium titanate is described.

Barium titanate powder is observed using a scanning electron microscope, and ten straight lines are drawn at random on the observed image. The lengths of the ten straight lines and the number of barium titanate particles on each straight line are measured. The particle size of barium titanate is calculated by dividing the length of each straight line by the number of barium titanate particles. Then, the mean value of the ten straight lines is calculated. This mean value is used as the mean particle size in the present invention.

Also, the specific surface area of barium titanate or the ground ceramic powder is measured as follows.

First, the adsorption amount $V_m$ ($cm^3/g$), which is the amount of He adsorbed to the whole surface in the form of a monomolecular layer, is obtained from the following BET adsorption isotherm:

$$x/\{(V(1-x)\}=1/(V_mC)+x(C-1)/(V_mC) \quad (1)$$

Specifically, three points are selected in a low relative-pressure region of the actual adsorption isotherm of He in which x is plotted in abscissa and x/{V(1−x)} is plotted in ordinate, and a straight line passing through these three points is obtained. At this time, the slope of this straight line is expressed by $(C-1)/(V_mC)$, and the intercept is expressed by $1/(V_mC)$. Thus, from the value of the slope of the straight line and the value of the intercept, the adsorption amount $V_m$ is calculated. In the above equation (1), x is the relative pressure (adsorption equilibrium pressure/saturated vapor pressure), V is the adsorption amount ($cm^3/g$) of He at the relative pressure x, and C is a parameter showing the difference between the adsorption heat in the first layer of He and the adsorption heat in the second layer.

Next, from the monomolecular layer adsorption amount $V_m$ obtained in the above manner, the specific surface area S ($m^2/g$) is obtained, using the following equation:

$$S=sV_mK_A/V_0 \quad (2)$$

In this equation, s is the cross sectional area ($m^2$) of one He molecule, $K_A$ is Avogadro's number, and $V_0$ is the volume of He per 1 mol (22,414 $cm^3$).

EXAMPLE 1

Per 100 mol of barium titanate powder serving as the main component, 1.0 mol of MgO powder, 0.3 mol of $Dy_2O_3$ powder, 0.3 mol of $Ho_2O_3$ powder, 0.6 mol of $SiO_2$ powder, and 0.05 mol of $Mn_3O_4$ powder were weighed as sub-components. The weighed barium titanate powders had $I_{(200)}/I_b$ values, specific surface area (Sa) values, and mean particle size values r shown in the following Table 1. The Sa·r values are also shown in Table 1.

Next, these main and sub-components and pure water were put into a ball mill equipped with zirconia balls. They were subjected to wet mixing, dehydrated, and dried to obtain a ceramic material.

Subsequently, the resultant dry powder was put into an alumina crucible of high purity and calcined in air for 2 hours, to obtain a calcined body.

The calcined body and pure water were put into a ball mill equipped with zirconia balls. They were subjected to wet grinding, dehydrated, and dried.

The specific surface area (Sb) values of the ground ceramic powders are shown in Table 1.

TABLE 1

| Sample No. | $I_{(200)}/I_b$ | Specific surface area Sa ($m^2/g$) | Mean particle size r (μm) | Sa · r | Specific surface area Sb ($m^2/g$) |
|---|---|---|---|---|---|
| 1* | 1.5 | 6.1 | 0.40 | 2.44 | 8.78 |
| 2* | 1.7 | 7.2 | 0.27 | 1.94 | 8.51 |
| 3 | 2.1 | 3.2 | 0.34 | 1.09 | 3.31 |
| 4 | 2.2 | 3.6 | 0.49 | 1.76 | 4.22 |
| 5 | 2.2 | 4.5 | 0.39 | 1.76 | 5.03 |
| 6 | 2.5 | 4.0 | 0.38 | 1.52 | 4.37 |
| 7* | 2.8 | 5.3 | 0.63 | 3.34 | 7.34 |
| 8* | 2.9 | 4.8 | 0.43 | 2.06 | 5.79 |
| 9* | 2.9 | 3.8 | 0.56 | 2.13 | 4.64 |
| 10 | 3.0 | 4.3 | 0.44 | 1.89 | 4.38 |
| 11 | 3.8 | 4.2 | 0.27 | 1.13 | 4.06 |
| 12* | 3.9 | 6.2 | 0.42 | 2.61 | 8.31 |
| 13 | 4.6 | 3.5 | 0.47 | 1.65 | 3.84 |
| 14 | 4.6 | 4.1 | 0.38 | 1.56 | 4.48 |
| 15 | 4.8 | 4.5 | 0.28 | 1.25 | 4.76 |
| 16 | 5.1 | 4.6 | 0.43 | 1.96 | 5.33 |
| 17* | 5.2 | 6.1 | 0.42 | 2.56 | 7.96 |
| 18 | 5.9 | 6.7 | 0.23 | 1.54 | 7.88 |
| 19 | 7.2 | 4.0 | 0.43 | 1.72 | 4.53 |
| 20* | 7.8 | 4.8 | 0.52 | 2.50 | 5.99 |
| 21* | 8.8 | 3.4 | 0.66 | 2.24 | 4.32 |
| 22 | 9.5 | 3.7 | 0.41 | 1.52 | 4.11 |
| 23* | 2.1 | 6.8 | 0.1 | 0.68 | 6.37 |

*Outside the range of the present invention

Thereafter, the ground ceramic powder was mixed with ethanol to coat the surface of the ceramic powder with ethanol. The ceramic powder, of which surface was covered with ethanol, was then mixed with an organic binder of polyvinyl butyral resin, a dispersion medium of n-butyl acetate, and a plasticizer of benzyl butyl phthalate, to obtain a slurry. The slurry was formed into a ceramic green sheet on a sheet of polyethylene terephthalate (hereinafter referred to as PET) by the doctor blade process.

An internal electrode paste of Ni powder having a mean particle size of about 0.4 μm was screen-printed in a desired pattern on one face of the ceramic green sheet obtained in the above manner.

Subsequently, after the removal of the PET sheet, three ceramic green sheets, each having the internal electrode on one face, were stacked such that the internal electrodes faced each other with the green sheets interposed therebetween. The three sheets were then thermocompression-bonded (temperatures of 80 to 100° C.; pressures of 80 to 150 $kg/cm^2$) for integration. Thereafter, the integrated sheet was cut into a size of 2.4 mm wide and 1.3 mm long, to obtain a laminated body. In this laminated body, the ceramic green sheets were stacked such that their internal electrodes were alternately exposed to the end faces of the laminated body.

The laminated body was put into a zirconia case with zirconia powder spread at its bottom, and the encased laminated body was subjected to a binder removal treatment by heating it to 350° C. in an atmosphere furnace with a current of nitrogen to burn the organic binder. Thereafter, the laminated body was sintered in a current of $N_2$+$H_2$ gas at 1,250° C. for 2 hours, to obtain a sintered body.

Lastly, an external electrode paste of copper particles was applied to the end faces of the sintered body where the internal electrodes were exposed. The applied external electrode paste was baked on the sintered body in a nitrogen atmosphere in a mesh-type continuous belt furnace at 900° C., to produce an external electrode. This gave a multilayer ceramic capacitor. In the multilayer ceramic capacitor thus obtained, the dielectric layer sandwiched between a pair of opposing internal electrodes had a thickness of 2 μm.

In the above manner, various multilayer ceramic capacitors were obtained, and the capacitance $C_0$ and the dielectric loss tanδ thereof were measured under the conditions of a measurement voltage of 1 V and a measurement frequency of 1 kHz. From the obtained capacitance $C_0$, the relative dielectric constant $\epsilon_r$ was calculated.

Further, DC bias characteristics were measured in the following manner. DC bias characteristics are represented by the rate of change of the capacitance CV upon application of a direct current relative to the capacitance $C_0$ without application of a DC voltage (this rate of change is expressed by $100\times(C_v-C_0)/C_0$).

First, a multilayer ceramic capacitor, which is a sample, was subjected to a heat treatment at 150° C. for 1 hour and left to stand at 25° C. for 24 hours, and then, the capacitance $C_0$ was measured under the above-described conditions. Thereafter, the capacitance $C_0$ was measured upon application of a DC voltage of 3.15 V under the same conditions as those of the $C_0$ measurement. DC bias characteristics were calculated from the obtained $C_0$ and $C_v$, using the calculation expression $100\times(C_v-C_0)/C_0$.

The relative dielectric constant Er, the dielectric loss tan δ, and the DC bias characteristics obtained are shown in Table 2.

TABLE 2

| Sample No. | Relative dielectric constant $\epsilon_r$ | dielectric loss tanδ (%) | DC bias characteristics (%) |
|---|---|---|---|
| 1* | 3150 | 8.2% | −33.6% |
| 2* | 3283 | 10.8% | −40.5% |
| 3 | 2887 | 6.3% | −10.8% |
| 4 | 3432 | 7.7% | −22.2% |
| 5 | 3099 | 8.3% | −14.3% |
| 6 | 3008 | 7.9% | −13.8% |
| 7* | 4428 | 18.3% | −56.3% |
| 8* | 3340 | 9.8% | −36.5% |
| 9* | 3878 | 12.6% | −36.9% |
| 10 | 3438 | 8.9% | −22.9% |
| 11 | 2933 | 5.9% | −13.8% |
| 12* | 4351 | 11.3% | −41.2% |
| 13 | 3829 | 8.4% | −23.8% |
| 14 | 3034 | 6.9% | −18.9% |
| 15 | 2901 | 7.3% | −12.3% |
| 16 | 3755 | 9.9% | −29.3% |
| 17* | 3499 | 9.8% | −49.6% |
| 18 | 2999 | 6.1% | −31.3% |
| 19 | 4235 | 8.3% | −19.8% |
| 20* | 4396 | 14.9% | −41.1% |
| 21* | 4135 | 13.8% | −43.5% |
| 22 | 4013 | 7.5% | −19.4% |
| 23* | 3618 | 3.11% | −38.2% |

*Outside the range of the present invention

As is clear from Table 1 and Table 2, the multilayer ceramic capacitors of samples Nos. 3 to 6, 10, 11, 13 to 16, 18, 19, and 22, with their $I_{(200)}/I_b$ values being in the range of 2 to 10 and their Sa·r values being in the range of 1 to 2, exhibit high relative dielectric constant, low dielectric loss, and excellent DC bias characteristics. Further, the above-mentioned samples excluding sample No. 18 satisfy the relation: $Sb \leqq 1.2$ Sa (where $0<Sb\leqq 6$ $m^2/g$, preferably $2\leqq Sb\leqq 6$ $m^2/g$), and they exhibited DC bias characteristics smaller than −30%.

Also, it is preferred that the DC bias characteristics be smaller than −30%, in order to obtain desired circuit characteristics when the capacitors are used in actual circuits.

Further, with respect to the multilayer ceramic capacitors of samples Nos. 3 to 6, 10, 11, 13 to 16, 19, and 22, the particle size distributions of the ground ceramic powders were also measured. The measurements of the particle size distributions were performed using a particle size distribution analyzer of laser diffraction type. The results obtained are shown in Table 3.

TABLE 3

| Sample No. | D10 (β) (μm) | D10 (α) (μm) | D90 (γ) (μm) | DC bias characteristics (%) |
|---|---|---|---|---|
| 3 | 0.38 | 0.45 | 0.48 | −10.8% |
| 4 | 0.43 | 0.68 | 0.72 | −22.2% |
| 5 | 0.41 | 0.53 | 0.74 | −14.3% |
| 6 | 0.39 | 0.50 | 0.72 | −13.8% |
| 10 | 0.35 | 0.58 | 0.72 | −22.9% |
| 11 | 0.39 | 0.44 | 0.51 | −13.8% |
| 13 | 0.39 | 0.58 | 0.75 | −23.8% |
| 14 | 0.44 | 0.49 | 0.53 | −18.9% |
| 15 | 0.38 | 0.41 | 0.55 | −12.3% |
| 16 | 0.58 | 0.71 | 0.85 | −29.3% |
| 19 | 0.51 | 0.59 | 0.68 | −19.8% |
| 22 | 0.49 | 0.54 | 0.64 | −19.4% |

As is clear from Table 3, samples 3, 5, 6, 11, 14, 15, 19, and 22 exhibit DC bias characteristics of smaller than −20%. When D50 of the ground ceramic powder is expressed by α, D10 β, and D90 γ, these samples satisfy the relations: $0.7\alpha\leqq\beta$ and $\gamma\leqq 1.5\alpha$ (where 0.4 $\mu m\leqq\alpha\leqq 0.7$ μm, 0.3 μm $\leqq\beta\leqq 0.5$ μm, and $\gamma\leqq 0.8$ μm).

On the other hand, sample No. 4 does not satisfy the above-mentioned relations of α and β. When the relations of a and β are not satisfied, there are a large number of fine particles with a large variation in particle size. Thus, the DC bias characteristics are not so improved in comparison with those of the samples satisfying the above-mentioned relations.

Also, sample No. 16 does not satisfy the relations: 0.4 μm $\alpha\leqq 0.7$ μm and 0.3 μm $\leqq\beta\leqq 0.5$ μm, with its a and β values being larger than these ranges. In this case, it is understood that even when the variation in particle size is small, if the mean particle size does not satisfy the above range, the effect of improving the DC bias characteristics is impaired.

As described above, the present invention can manufacture a multilayer ceramic capacitor having high relative dielectric constant, low dielectric loss, and excellent DC bias characteristics, by using as the main component barium titanate of which particle size is small and of which mean particle size is as uniform as possible. Further, by using a ground ceramic powder of which mean particle size is close to that of the raw material barium titanate and of which particle size is as uniform as possible, it is also possible to manufacture a multilayer ceramic capacitor having more excellent DC bias characteristics.

Although multilayer ceramic capacitors comprising $Dy_2O_3$ and $Ho_2O_3$ as rare earth oxides were used in this example, the same effects are also produced in those comprising at least one rare earth oxide selected from the group consisting of $Dy_2O_3$, $Ho_2O_3$, $Er_2O_3$, and $Yb_2O_3$ as a sub-component.

Further, a DC voltage of 3.15 V was applied in this example; however, even when a different voltage was applied, the multilayer ceramic capacitors manufactured by the manufacturing method of the present invention exhibited high relative dielectric constant, low dielectric loss, and good DC bias characteristics.

Furthermore, the dielectric layer sandwiched between a pair of opposing internal electrodes had a thickness of 2 μm in the above example; however, if the thickness is in a range of 1 to 3 μm, by making an adjustment such that the particle size and the particle size distribution of barium titanate and the ground ceramic powder satisfy the above-described ranges, good DC bias characteristics can be obtained.

INDUSTRIAL APPLICABILITY

The manufacturing method of the present invention can provide a multilayer ceramic capacitor having high relative dielectric constant, low dielectric loss, and excellent DC bias characteristics.

What is claimed is:

1. A method of manufacturing a multilayer ceramic capacitor, comprising the steps of:

(a) alternately layering internal electrodes and ceramic green sheets containing a ceramic material comprising barium titanate to form a laminated body;

(b) sintering said laminated body to obtain a sintered body; and (c) forming an external electrode on end faces of said sintered body to obtain a multilayer ceramic capacitor, wherein said barium titanate has a diffraction line derived from (002) plane and a diffraction line derived from (200) plane in an X-ray diffraction chart, the ratio $I_{(200)}/I_b$ of peak intensity $I_{(200)}$ at $2\theta_{(200)}$ to diffraction intensity $I_b$ at a midpoint angle between peak angle $2\theta_{(002)}$ of the diffraction line derived from the (002) plane and peak angle $2\theta_{(200)}$ of the diffraction line derived from the (200) plane is 2 to 10, and the product $r \cdot Sa$ of mean particle size r (μm) of said barium titanate and specific surface area Sa ($m^2/g$) is 1 to 2.

2. The method in accordance with claim 1, wherein said step (a) comprises the step of calcining said ceramic material and then grinding it, and specific surface area Sb ($m^2/g$) of said ground ceramic powder satisfies the relations: $Sb \leqq 1.2\ Sa$ and $0 < Sb \leqq 6$.

3. The method in accordance with claim 2, wherein 50% cumulative frequency distribution particle size D50 of said ground ceramic powder based on the number of particles is expressed by $\alpha$(μm), 10% cumulative frequency distribution particle size D10 thereof is expressed by $\beta$(μm), and 90% cumulative frequency distribution particle size D90 thereof is expressed by $\gamma$(μm), and wherein said $\alpha$, $\beta$ and $\gamma$ satisfy the relations: $0.7\alpha \leqq \beta$, $\gamma 1.5\alpha$, $0.4 \leqq \alpha \leqq 0.7$, $0.3 \leqq \beta \leqq 0.5$, and $\gamma \leqq 0.8$.

* * * * *